W. W. LOCKWOOD.
HAY PULVERIZER.
APPLICATION FILED AUG. 17, 1910.
1,006,573.
Patented Oct. 24, 1911.
2 SHEETS—SHEET 2.
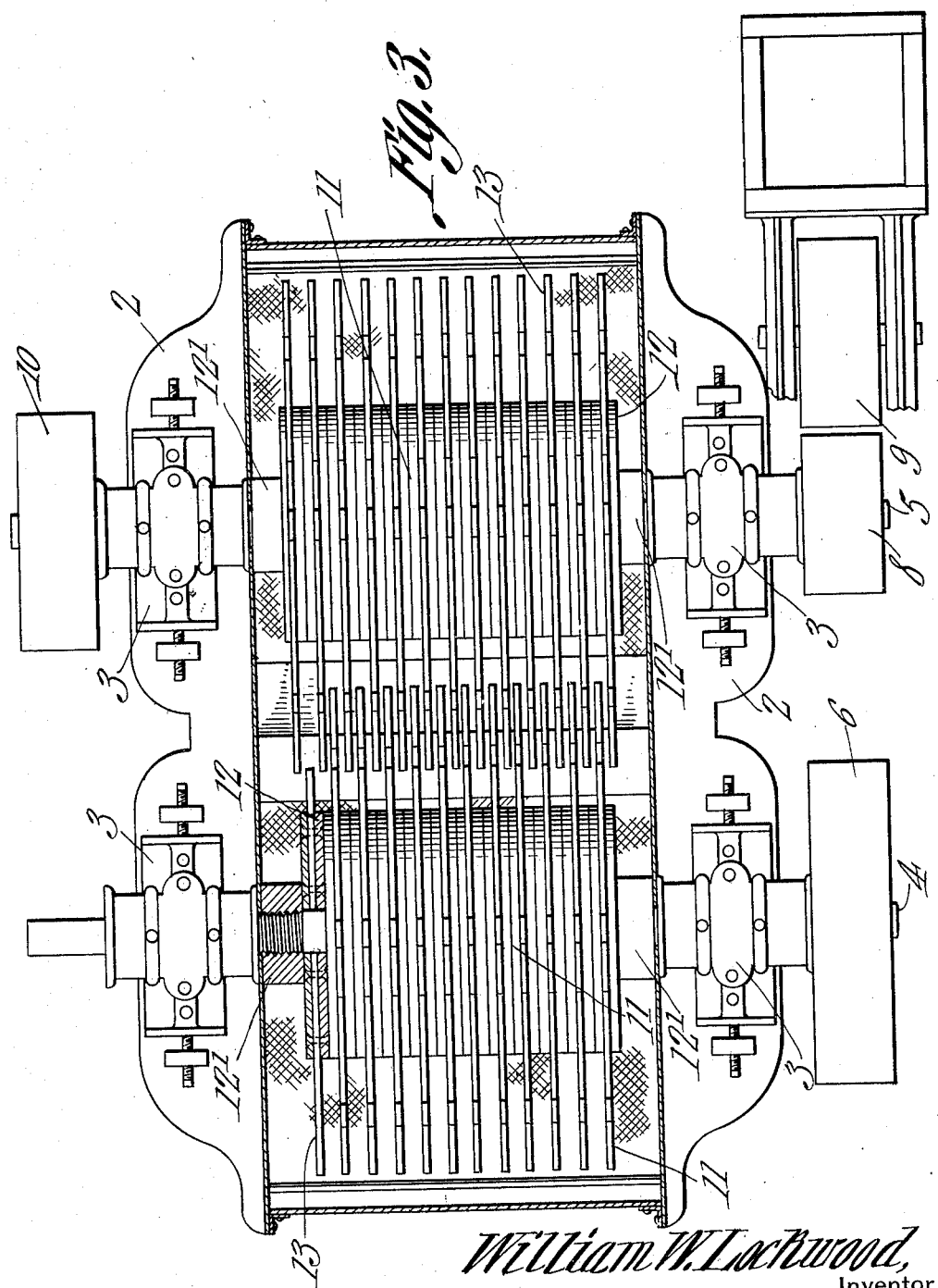
William W. Lockwood,
Inventor.
Witnesses
by C. A. Snow & Co.
Attorneys
COLUMBIA PLANOGRAPH CO., WASHINGTON, D. C.

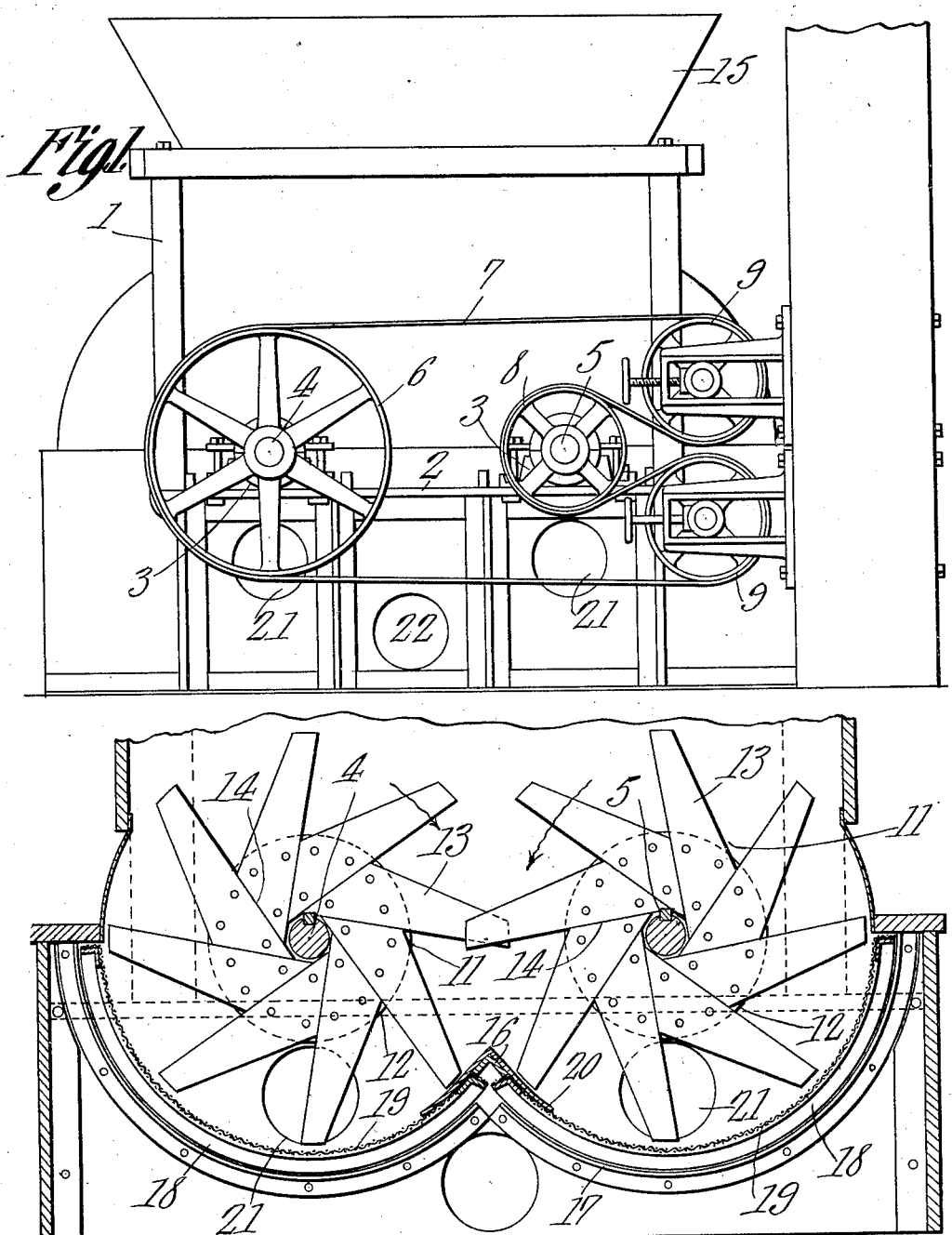

UNITED STATES PATENT OFFICE.

WILLIAM W. LOCKWOOD, OF WINFIELD, KANSAS.

HAY-PULVERIZER.

1,006,573.  Specification of Letters Patent.  Patented Oct. 24, 1911.

Application filed August 17, 1910. Serial No. 577,645.

*To all whom it may concern:*

Be it known that I, WILLIAM W. LOCKWOOD, a citizen of the United States, residing at Winfield, in the county of Cowley and State of Kansas, have invented a new and useful Hay-Pulverizer, of which the following is a specification.

This invention relates to machines for reducing alfalfa hay and the like to a finely comminuted state, one of the objects of the invention being to provide a novel arrangement of coöperating cutting blades so disposed relative to each other as to prevent the machine from becoming choked and, at the same time, quickly reduce the hay or the like into a pulverized condition.

Another object is to provide improved means for mounting the cutting blades so that any one or more of them can be conveniently removed should it become broken or injured, and a new one substituted therefor.

A further object is to provide a screen concave for use in connection with the cutting elements, said concave being readily removable.

With the foregoing and other objects in view the invention consists of certain novel details of construction and combinations of parts hereinafter more fully described and pointed out in the claims.

In the accompanying drawings, the preferred form of the invention has been shown.

In said drawings,—Figure 1 is a side elevation of the machine. Fig. 2 is a central vertical longitudinal section therethrough. Fig. 3 is a horizontal section through the machine, all but one of the cutting elements being shown in plan, and the remaining elements being illustrated in section.

Referring to the figures by characters of reference 1 designates the casing having laterally extending table portions 2 which support adjustable pillow blocks 3 carrying the main shafts 4 and 5 of the machine. The shafts extend transversely of the casing, the shaft 4 being provided with a pulley 6 receiving motion through a belt 7 from a pulley 8 arranged on one end of the shaft 5, this pulley being smaller than the pulley 6 and the belt being mounted on idlers 9 supported adjacent the casing 1. The bearings of these idlers are adjustably mounted, so that any slack in the belt 7 can be quickly taken up. A pulley 10 is secured to one end of the shaft 5 and is adapted to receive motion from a suitable motor, not shown.

Arranged on each shaft 4 and 5 is a series of cutting units designated generally by the numeral 11, each of these units including two disks 12 having blades 13 disposed between them and extending beyond the peripheries thereof. The advancing or cutting edges of the blades are tangentially disposed with relation to the shafts 4 and 5 and the inner end of each blade is cut off diagonally, as indicated at 14 and abuts against the advancing edge of the next adjoining blade. This arrangement of the blades has been clearly shown in Fig. 2. All of the blades are held in place by means of rivets or the like extending transversely through them or through the disks 12. It will thus be seen that each pair of disks and the blades combined therewith constitutes a single cutting unit. All of these units are keyed upon their respective shafts and the units of the two series are disposed in staggered relation so that the blades of one series will work between the blades of the other series. Moreover the blades connected to the shaft 5 are arranged oppositely to the blades on the shaft 4 because the two shafts rotate in opposite directions. In order that the cutting units may be properly held together upon their respective shafts, collars 12' are screwed onto the shafts adjacent the ends of each series of cutting units and by adjusting these collars toward each other the cutting units will be securely held between them.

The upper portion of the casing 1 may be in the form of a hopper 15 through which the material to be pulverized, is supplied to the rotating cutting units. An inverted V-shaped cross strip 16 is arranged within the casing and between the areas traversed by the cutting units, this cross strip being arranged at the inner ends of arcuate supporting cleats 17 on which are slidably mounted the arcuate side strips 18 of concaved screens 19. These screens extend from the strip 16 to the two ends of the casing 1 and are concentric with the respective shafts 4 and 5. An angular deflector plate 20 straddles the cross strip 16 and laps the adjacent end portions of the screens 19. Hand holes 21 may be formed in one side of the casing 1 and adjacent the bottom portions of the respective screens 19, and a suction outlet 22 may be formed in the side of the casing 1 and below the screens.

It will be apparent that when the machine is operated, the two shafts 4 and 5 will rotate in opposite directions and cause the blades of one series of cutting units to work between the blades of the other series. It is intended to rotate the shaft 5 at a high speed, preferably double that of the shaft 4, the best results being obtained by driving the shaft 4 at the rate of 800 revolutions per minute and the shaft 5 at the rate of sixteen hundred revolutions per minute. A suction is set up in any suitable manner through the opening 22 and the alfalfa hay or other material to be pulverized is supplied to the hopper by means of any suitable form of feeder. The material will be engaged by the rapidly rotating blades 13 and as the blades on the shafts move at different speeds, they cut the material at each side of each of the low speed blades, thus quickly reducing the material to a finely comminuted state. The particles are drawn through the screens by the suction set up through the opening 22 and this suction also serves to draw the leaves and other brittle portions of the plant through the screen before they are rubbed to a dust and, as the tougher stems of the plant are cut and shredded by the blades 13, the product of the machine is of a uniform degree of fineness and is not, as heretofore, made up of particles greatly differing in size. By utilizing the deflector plate 20 the straws or coarser parts of the material are prevented from being thrown through the screens by the rapidly rotating blades.

It will be noted that the cutting units are all perfectly balanced. Moreover, by utilizing long cutting blades such as shown, there is ample room for the hay while being cut and it is prevented from packing or crowding between the blades to such an extent as to require the application of an undesirable amount of power for the purpose of properly driving the machine.

Various changes can of course be made in the construction and arrangement of the parts without departing from the spirit or sacrificing any of the advantages of the invention as defined in the appended claims.

What is claimed is:—

1. A machine of the class described including parallel shafts, means for simultaneously rotating the shafts in opposite directions, and a plurality of cutting units upon each shaft, each of said units including spaced disks, and a series of blades disposed in the same plane and arranged between and secured to the disks, all of said blades being parallel with the faces of the disks and projecting beyond the peripheries of said disks, the advancing or cutting edges of the blades being tangentially disposed relative to the shafts on which the disks are mounted.

2. A machine of the class described including a casing, shafts journaled therein, means for rotating the shafts simultaneously in opposite directions, a plurality of cutting units secured to and revoluble with each shaft, each unit including spaced disks, and a series of flat blades interposed between and contacting with the disks, said blades and disks being secured together to move as one body, the blades being extended beyond the peripheries of the disks, an inverted V-shaped cross strip secured within the casing and extending between the areas traversed by said cutting units, arcuate supporting cleats extending from said strip and to the ends of the casing, concaved screens slidably mounted on the cleats and abutting against said cross strip, and an imperforate angular deflector plate straddling the cross strip and lapping the adjacent ends of the screens.

In testimony that I claim the foregoing as my own, I have hereto affixed my signature in the presence of two witnesses.

WILLIAM W. LOCKWOOD.

Witnesses:
Geo. E. Funk,
W. W. Crary.

---

Copies of this patent may be obtained for five cents each, by addressing the "Commissioner of Patents, Washington, D. C."